US009781228B2

(12) United States Patent
Roberts

(10) Patent No.: US 9,781,228 B2
(45) Date of Patent: Oct. 3, 2017

(54) COMPUTER-IMPLEMENTED SYSTEM AND METHOD FOR PROVIDING CONTEXTUAL MEDIA TAGGING FOR SELECTIVE MEDIA EXPOSURE

(71) Applicant: Palo Alto Research Center Incorporated, Palo Alto, CA (US)

(72) Inventor: Michael Roberts, Los Gatos, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 339 days.

(21) Appl. No.: 14/582,109

(22) Filed: Dec. 23, 2014

(65) Prior Publication Data
US 2016/0179864 A1    Jun. 23, 2016

(51) Int. Cl.
| H04L 29/08 | (2006.01) |
| G06F 17/30 | (2006.01) |
| G06Q 50/10 | (2012.01) |
| G06Q 50/00 | (2012.01) |

(52) U.S. Cl.
CPC ...... *H04L 67/306* (2013.01); *G06F 17/30038* (2013.01); *G06F 17/30867* (2013.01); *G06F 17/30958* (2013.01); *G06Q 50/00* (2013.01); *G06Q 50/10* (2013.01)

(58) Field of Classification Search
CPC ................................................ G06F 17/30345
See application file for complete search history.

(56) References Cited

U.S. PATENT DOCUMENTS

| 2009/0177634 | A1* | 7/2009 | Behrendt | G06F 17/30 |
| 2012/0314917 | A1* | 12/2012 | Kiyohara | G06F 17/30029 382/118 |
| 2013/0124499 | A1* | 5/2013 | Liau | G06F 15/16 707/709 |

OTHER PUBLICATIONS

Chen et al., "An Ontology for Context-Aware Pervasive Computing Environments," The Knowledge Engineering Review, vol. 18(3), pp. 197-207, Sep. 2003.
Rensink et al., "Abstract Graph Transformation." Electronic Notes in Theoretical Computer Science (ENTCS), vol. 157(1), Jan. 31, 2005.

* cited by examiner

*Primary Examiner* — Peiyong Weng
(74) *Attorney, Agent, or Firm* — Patrick J. S. Inouye

(57) ABSTRACT

A computer-implemented system and method for providing contextual media tagging for selective media exposure is provided. A media file is maintained in a database. Contextual information is generated for a user. The media file is associated with the user contextual information, and the media file is shared to individuals in a social network of the user based on the user contextual information.

16 Claims, 10 Drawing Sheets

COMPUTER-IMPLEMENTED SYSTEM AND METHOD FOR PROVIDING CONTEXTUAL MEDIA TAGGING FOR SELECTIVE MEDIA EXPOSURE

FIELD

This application relates in general to automatic media sharing based on contextual information and, in particular, to a computer-implemented system and method for providing contextual media tagging for selective media exposure.

BACKGROUND

Social networking sites (SNS) provide user platforms for posting comments and sharing media files among users via the Internet. Users of SNS usually have access to SNS via a mobile application on mobile devices and a Web application on a desktop or laptop computers. For instance, "Facebook," provided by Facebook, Inc., Menlo Park, Calif., allows creating a friend network for exchanging messages, sharing pictures and videos, and continuously displaying updates regarding a user between the users. Further, media-sharing sites, one type of the SNS, allow users to upload media files, such as pictures, videos, and audio files to a Website to share the media files with others. For instance, "Flickr," provided by Yahoo!, Inc., Sunnyvale, Calif., provides a community to selectively share pictures and videos with other users. In addition, "Instagram," provided by Facebook, Inc., Menlo Park, Calif., similarly provides a tool to share pictures and videos among friends and family members. Mobile devices and computers currently in the market typically equip with devices to create various media files, including cameras, video recorders, and audio recorders. Thus, mobile or computer users can directly upload image files, video files, and audio files through SNS or media sharing sites for sharing the media files with a group of individuals they prefer.

To share media files through SNS or media sharing sites, users typically need to specify a group of individuals to share based on each context of media files. Traditionally, media files uploaded onto the SNS or media sharing sites by a user are manually shared with other users by specifying a receiver of the media files. Further, SNS and media sharing sites have been providing user settings for limiting a display of certain user information to certain individuals or group of individuals. For example, Facebook enables the user to share pictures and videos with public or preferred "friends." The preferred "friends" can be categorized as "close friends," "family," "all the friends in Facebook," or even an individual friend. However, a selection of individual or groups for sharing has been only manually specified by the user each time when the user uploads each media file based on the context of the media file. Similarly, media sharing sites, such as Flickr and Instagram, allow users to selectively share media files to groups of individuals by manually specifying by the user. Thus, media sharing through SNS and media sharing sites requires the users to take an additional step to specify a group of individuals to share the media files.

Therefore, there is a need for automatically sharing media files with a specified group of individuals based on contexts of the media files when the media files are captured.

SUMMARY

An embodiment provides a computer-implemented system and method for providing contextual media tagging for selective media exposure. A media file is maintained in a database. Contextual information is generated for a user. The media file is associated with the user contextual information, and the media file is shared to individuals in a social network of the user based on the user contextual information.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Contextual applications have been known to provide relevant contextual information regarding the user in a timely and informative manner based on the understanding of user's current activities. The user's current activities are determined from user information extracted from social media and sensor data. A platform for contextual applications, as described in commonly-assigned U.S. Pat. No. 9,208,439, the disclosure of which is incorporated by reference, processes contextual data in a real time and supports contextual applications for mobile applications. Each time when contextual data for a user is collected, the contextual data is applied to a context graph or semantic graph describing the user's current state. Thus, real-time processing of contextual data of the user can provide relevant contextual information at the very moment that the user is engaged in a particular activity. However, adopting such a contextual intelligence platform to social media Web applications and specifically, applying the contextual information to media files are still uninvestigated.

Figure 1:
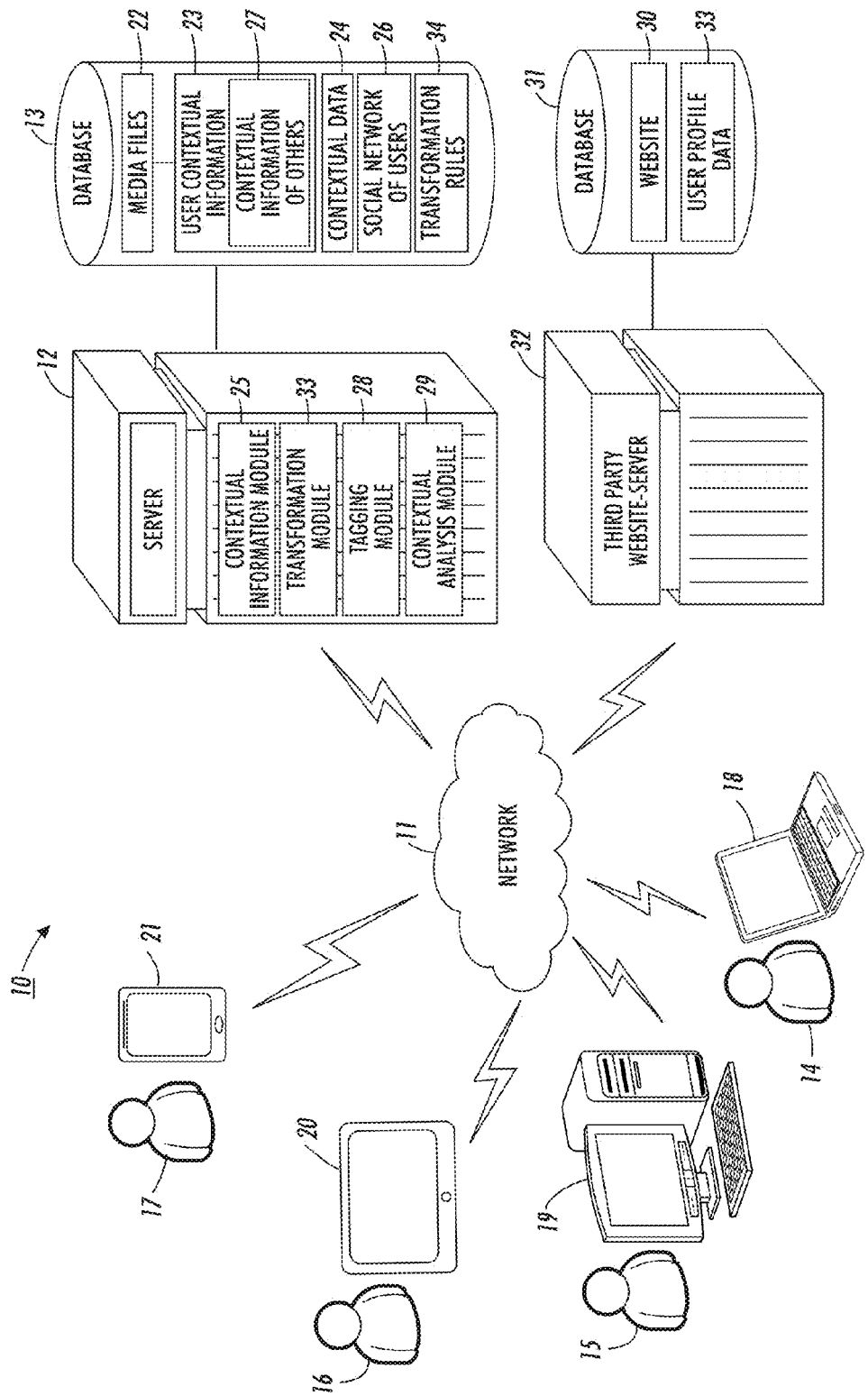
FIG. 1 is a functional block diagram showing a computer-implemented system for providing contextual media tagging for selective media exposure, in accordance with one embodiment.

To automatically share a specific media file to a specific group of individuals, each media file captured by a user needs to be instantly processed to identify a context and also identify a potential group of individuals within a social network that the media file can be shared. FIG. 1 is a functional block diagram showing a computer-implemented system 10 for providing contextual media tagging for selective media exposure, in accordance with one embodiment. Contextual media tagging starts when a media file 22 is captured by mobile computers 20, 21, or uploaded to a laptop 18 or desktop computers 19. The mobile computers 21, 22 typically equip devices to generate media files, such as cameras, video recorders, and sound recorders (not shown). Further, the laptop 18 and desktop computers 19 can also equip with cameras, video recorders, and sound recorders to generate media files. Other types of built-in devices of computers 18, 19, 20, 21 to generate media files are possible. In one embodiment, the media files 22 are transferred through a network 11 and stored in a database 13 via a server 12 interconnected to the database 13. In a further embodiment, the media files 22 can be stored in file systems. The media files 22 can be automatically transferred to the database 13 or manually transferred by each user 14, 15, 16, 17. Other methods of transferring media files 22 are possible.

The server 12 collects contextual data 24 for each user when the media file 22 was captured from various sources, such as from user profile data 33 stored in a database 31 for a third-party Websites 30, the activities of the user performed through mobile or stationary computers 18, 19, 20, 21, or physical data regarding the user recorded through the mobile or stationary computers 18, 19, 20, 21. A contextual information module 25 generates user contextual information 23 for the user 14, 15, 16, 17 and stores the user contextual information 23 in the database 13, as further described infra with reference to FIG. 4. The server 12 further identifies social networks 26 for the user including a set of groups of individuals, such as family, friends, and so on. The contextual information module 25 can further generate contextual information 27 for each individual in the social network of the user, as further described infra with reference to FIGS. 9 and 10. A transformation module 33 transforms a fraction of the user contextual information 23 into another user contextual information 27 based on transformation rules 34, as further described infra with reference to FIGS. 6 and 7. Then, the user contextual information 23 is tagged with the media file 22 by a tagging module 28, as further described infra with reference to FIG. 10. A context analysis module 29 analyzes the user contextual information 23 attached to the media file 22 to identify a current status of the user and to share the media file 22 to an appropriate individual. The media file 22 tagged with the user contextual information 23 can be shared with the individuals in the social network of the user 26 through the third-party Websites 30, such as Facebook, Flickr, or Instagram, stored in the third-party database 31, via the third-party Website server 32. Other types of social network for the user are possible.

Each computer 18, 19, 20, 21 includes components conventionally found in general purpose programmable computing devices, such as essential processing unit, memory, input/output ports, network interfaces, and known-volatile storage, although other components are possible. Additionally, the computers 18, 19, 20, 21 and the server 12 can each include one or more modules for carrying out the embodiments disclosed herein. The modules can be implemented as a computer program or procedure written as a source code in a conventional programming language and is presented for execution by the central processing unit as object or byte code or written as inter-credit source code in a conventional interpreted programming language inter-credit by a language interpreter itself executed by the central processing unit as object, byte, or inter-credit code. Alternatively, the modules could also be implemented in hardware, either as intergraded circuitry or burned into read-only memory components. The various implementation of the source code and object byte codes can be held on a computer-readable storage medium, such as a floppy disk, hard drive, digital videodisk (DVD), random access memory (RAM), read-only memory (ROM), and similar storage mediums. Other types of modules and module functions are possible, as well as other physical hardware components.

Figure 2:
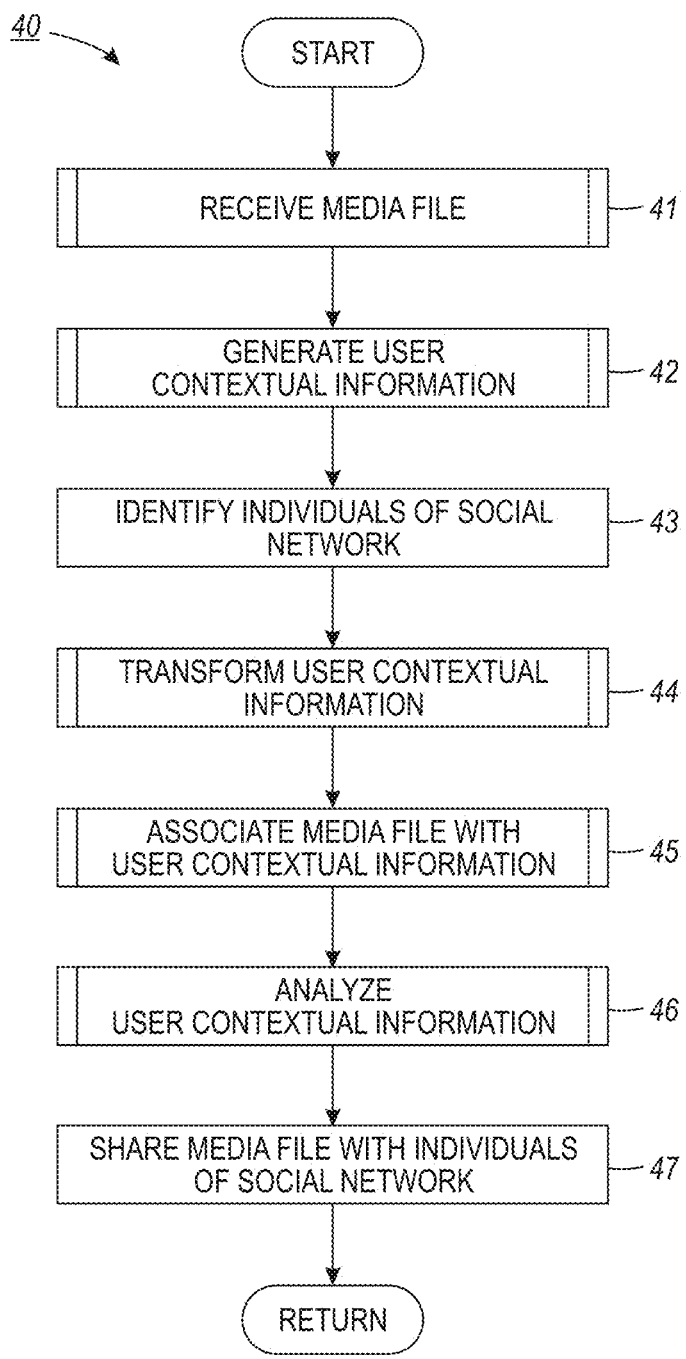
FIG. 2 is a flow diagram showing a computer-implemented method for providing contextual media tagging for selective media exposure, in accordance with one embodiment.
Figure 3:
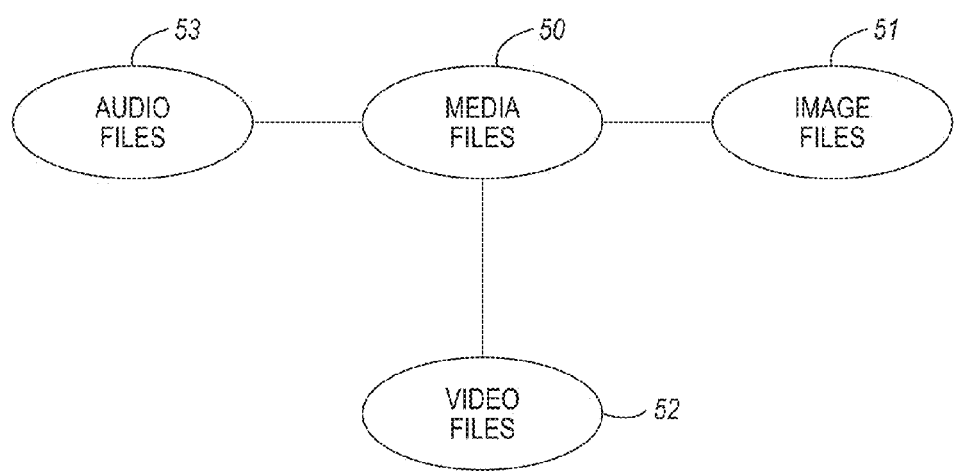
FIG. 3 is a functional block diagram showing examples of media files for use in the method of FIG. 2.

Tagging contextual information of a user with media files provides automatic media sharing experience with selective exposure of the media file only to a selected group of individuals, which requires little effort on the part of the user. FIG. 2 is a flow diagram showing a computer-implemented method 40 for providing contextual media tagging for selective media exposure, in accordance with one embodiment. Contextual media tagging starts with when a media file, having captured by a user, is received by the system (step 41). Media files can take a various forms. By way of example, FIG. 3 is a functional block diagram showing examples of media files 50 for use in the method of FIG. 2. Media files 50 can be image files 51, such as pictures, video files 52, such as video recordings, and audio files 53, such as sound recordings. The media files 50 can be stored in a database at the time the media files 50 are received, or after the media files 50 are tagged with user contextual information, as further described infra with reference with FIG. 10. Referring back to FIG. 2, in one embodiment, at the time when a media file is received, a semantic graph for the user is generated (step 42), as further described infra with reference to FIG. 4. In a further embodiment, the semantic graph can be continuously generated and updated when a new incoming contextual data is collected. Other examples of timing for generating or updating the user semantic graph are possible.

As a part of user contextual information, social networks for the user are usually identified (step 43). The social networks are formed with individuals, each of whom has a certain relationship with the user, and may include categories of individuals, such as "friends," "family," and "close friends." For each individual in the user's social network, contextual information can be also generated. Once the individuals in the user's social network are identified for sharing the media file, then a fraction of the user's contextual information can be transformed to other information, such as a higher concept of the fraction of the user contextual information, based on a transformation rule (step 44), as further described infra with reference to FIGS. 6 and 7. Once the user contextual information is completely identified, the user contextual information is tagged with the media file (step 45), as further described infra with reference to FIG. 8. By analyzing the tagged user contextual information (step 46), the media file can be properly shared with appropriate individuals (step 47).

Figure 4:
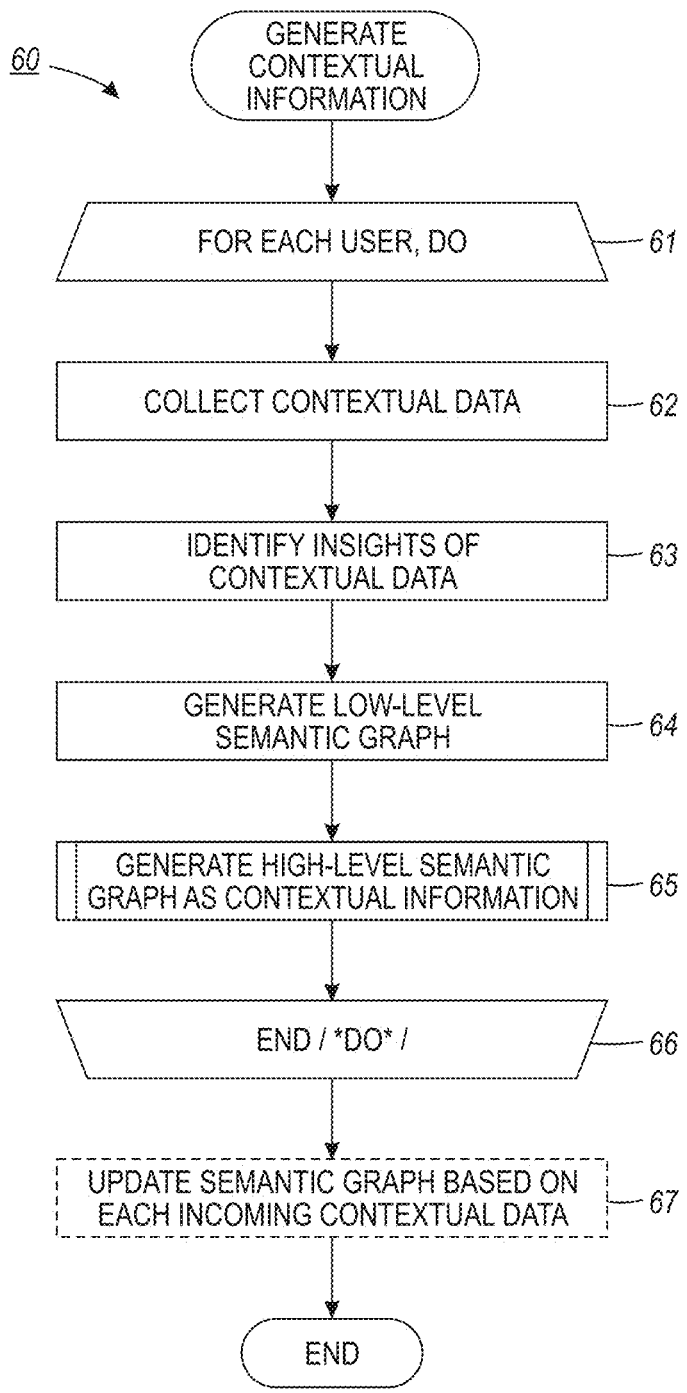
FIG. 4 is a flow diagram showing a routine for generating contextual information for a user using semantic graphs for use in the method of FIG. 2.

User contextual information can be generated using semantic graphs. Semantic graphs can represent contextual information of the user in a set of semantic relationships. FIG. 4 is a flow diagram showing a routine 60 for generating contextual information for a user using semantic graphs for use in the method of FIG. 2. For creating contextual information for each user (step 61), first, contextual data regarding the user is collected (step 62). The contextual data can be a variety of data collected from different sources and supports building context graphs for each user, as described in commonly-assigned U.S. Pat. No. 9,208,439, the disclosure of which is incorporated by reference. In one embodiment, the contextual data can include low-level event data regarding the user. For example, the low-level event data can include user's walking, running, sitting, and not moving, or semantic location information provided by reverse geocoding, such as showing that the user is located in a park. For another example, the low-level event data can include physical activity data of the user detected from devices, such as sensor and accelerometers. Further, the contextual data can include user profile data on third party social media sites, such as Facebook, Twitter, provided by Twitter, Inc., San Francisco, Calif., LinkedIn provided by LinkedIn Co., Mountain View, Calif., or emails of the user. The contextual data from the social media sites can include user's identity information, likes and dislikes, networks, user interests, pictures, videos, sound recordings, posts, and activities within the third party Website. Other types of low-level event data are possible.

Figure 5:
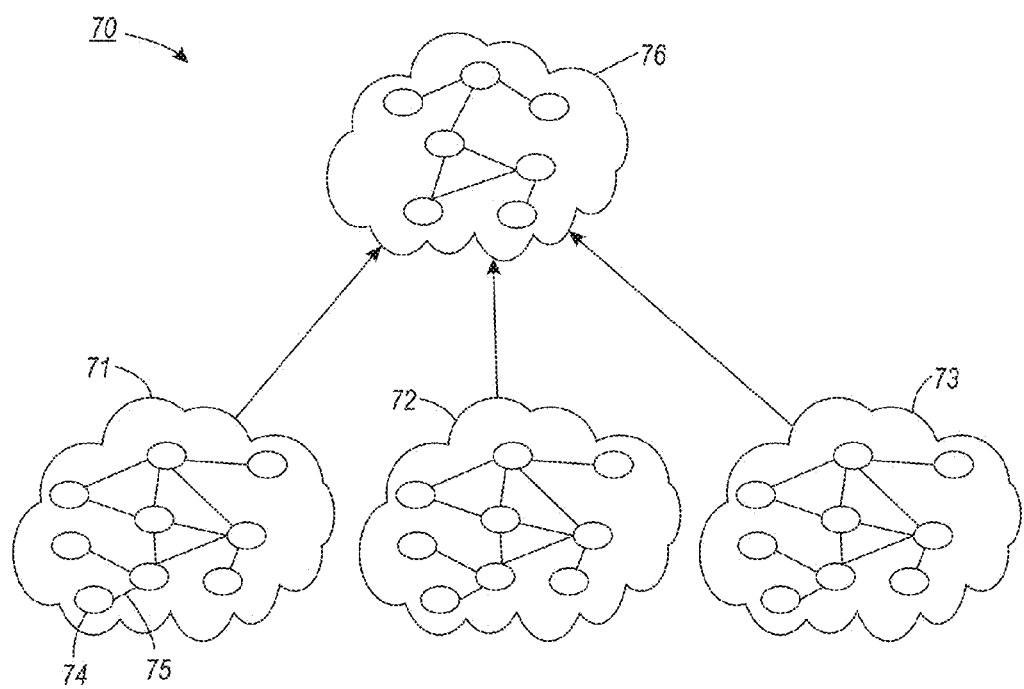
FIG. 5 is a process flow diagram showing, by way of example, semantic representation for use in the method of FIG. 4.

The collection of the contextual data regarding the user is further processed to identify insights of the contextual data (step 63). The identified insights for the user can be usually represented in a semantic graph. Based on the identified insights, a low-level semantic graph is generated (step 64). For example, a low-level semantic graph can include insights, such as "Mary is in a parking lot," "she is walking," and "the time is close to the time when she usually leaves work." By combining and lifting these insights, a high-level semantic graph can be created (step 65). For the earlier example of Mary's activities, the high-level semantic graph can include an insight, such as "Mary is leaving work." By way of example, FIG. 5 is a process flow diagram showing semantic representation 70 for use in the method of FIG. 4. Low-level semantic graphs 71, 72, 73 are formed with nodes 74 and edges 75. Insights from each low-level semantic graph 71, 72, 73 are collected and create a high-level semantic graph 76. In this way, contextual information for each user can be created (step 66). The semantic graphs for the users are usually temporary stored in a database or in memory and can be updated based on each incoming contextual data as necessary (step 67).

For each user, a social network is usually formed based on a "friends" network or groups created through third-party Websites, such as general social media sites or media file sharing sites. As an example of a social media site, Facebook creates a "friends" network for each user by connecting the user and other users on Facebook. Typically, the other users in the "friends" network can have access to components of the user's Facebook Website. The user may manually change a level of access to the components of the user's Website for each individual. As an example for a media file sharing site, Flickr allows the user to create public groups open to anyone, public groups with invitations, and private groups to share media files. For the private groups, the user can create, for example, a family group, close friends group, or work group. In one embodiment, the social network for the user can be built based on at least one of "friends" networks or groups. In a further embodiment, the social networks can be built on multiple "friends" networks and groups. Further, the social network can be categorized as "friends," "family," "work," and so on. Other methods of generating a social network for a user are possible.

Figure 6:
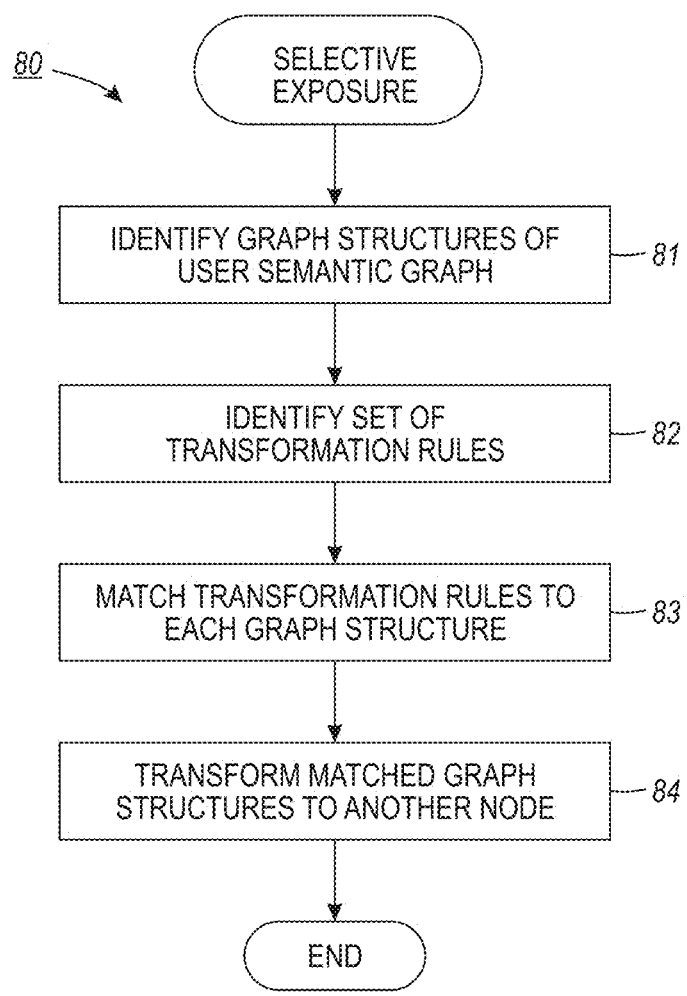
FIG. 6 is a flow diagram showing a routine for selectively exposing media files for use in the method of FIG. 2.
Figure 7:
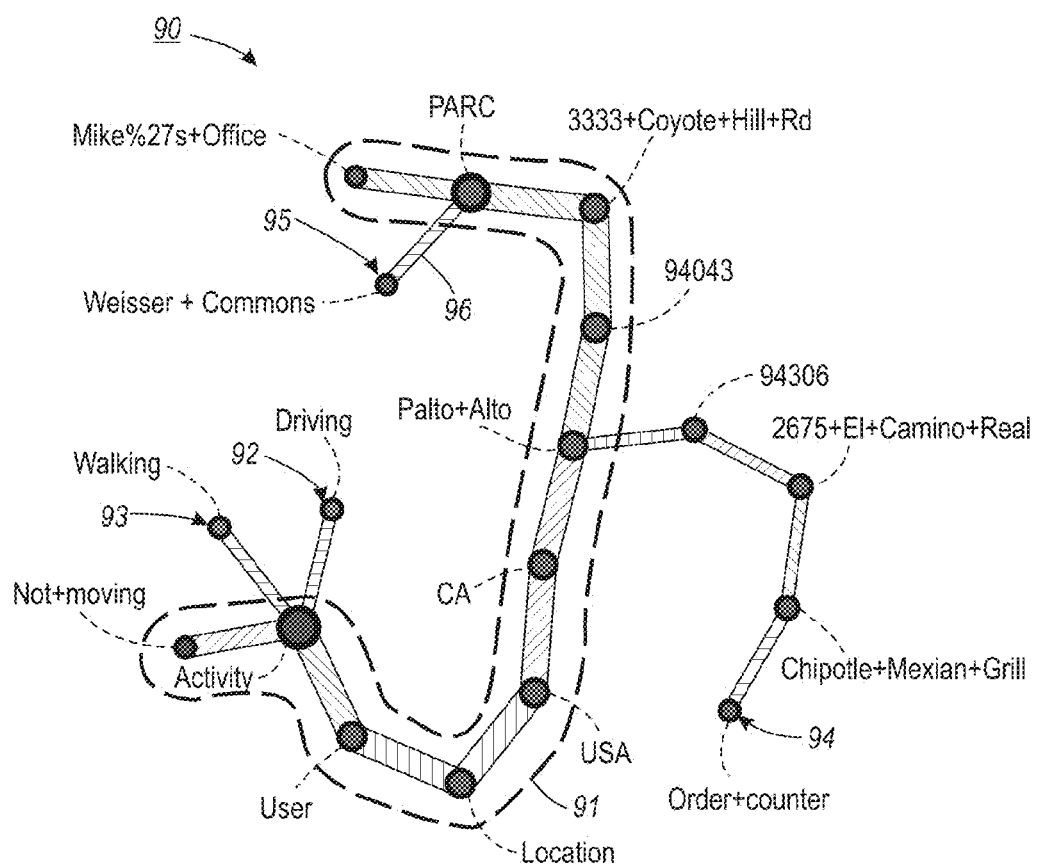
FIG. 7 is a graph showing, by way of example, activities performed by a user in the Palo Alto area.

A user can limit the exposure levels of user contextual information to other individuals by specifying rules that transform insights of the user contextual information into higher-level concepts. FIG. 6 is a flow diagram showing a routine 80 for selectively exposing media files for use in the method of FIG. 2. A user can abstract potentially sensitive user contextual information to a more general semantic representation based on graph structures, such as described in commonly-assigned U.S. Patent Application Publication No. 2016/0179901, pending, the disclosure of which is incorporated by reference. Abstraction of user contextual information can start from identifying graph structures of a user semantic graph (step 81). By way of example, FIG. 7 is a graph 90 showing activities performed by a user in the Palo Alto area. The graph 90 contains various nodes 92, 93, 94, 95 and edges 96. Each node 92, 93, 94, 95 describes each different user contextual information regarding the user. In one embodiment, locational user information can be described as a chain of location nodes or structural pattern of locational nodes. In this example, a chain of nodes 91 contains nodes, such as "Location," "Palo Alto," "3333+ Coyote+Hill+Road," "Not Moving," and so on, and are connected with edges as a main branch in the graph. Other types of graph structures are possible.

Referring back to FIG. 6, once the graph structures of the user semantic graph are identified, a set of transformation rules for transforming each graph structure is identified (step 82). The transformation rules define how to transform each of the graph structures of the user semantic graph to another node. The transformation rules can apply to each graph structure of the user semantic graph (step 83). In one embodiment, such transformation can be based on a hierarchy of categories of nodes and replace a low-level concept to a higher-level concept. For example, a hierarchy of node categories can include a category of work, home, restaurant, and so on as a high-level node category and an address or coordinates of each location of work, home, and restaurant can be located as subcategories of the work, home, and restaurant categories in a hierarchy tree. Thus, transformation rules can state that specific address or coordinates can be replaced to work, home, and restaurant. In a further embodiment, the transformation rules can state that a certain structural pattern of the user semantic graph can be replaced to a higher-level concept node than the concept of the certain structural pattern. In a still further embodiment, a transformation rule can replace a certain chain of nodes to a node with higher-level of semantic concept than the chain of nodes. Other types of transformation rules are possible. Referring back to the example of FIG. 7, processing of the main branch chain of nodes can generate user information that the user is at 3333 Coyote Hill Road, Palo Alto now and not moving. In this example, the transformation rule can be indicated as "User→Location→PARC→3333 Coyote Hill Road→Palo Alto→California-USA: User→Location-→Work." Thus, the chain of nodes will be replaced to "Work" node. Further, other nodes 92, 93, 94, 95 can include further information regarding the user. For example, sub branches in this example containing nodes "Driving,"92, "Walking," 93, and "Weisser+Commons," 95 are not extending with other nodes and could mean that the user is currently neither "walking," "driving," nor "at Weisser Commons." Further, a smaller branch including "Order+ counter" node 94 can mean that the user was in the past performed the activity going to Chipotle Mexican Grill at 2675 El Camino Real and ordering at the counter. Other graph mechanisms are possible.

Referring back to FIG. 6, the graph structure matched with one of the transformation rules is then transformed to another node (step 84). The transformation can occur only to the selected graph structure so that the rest of the graph structures in the semantic graph will not be changed. The transformation can be performed for any type of user contextual information, such as home locations, activities, and interests. In this way, replacing a low-level concept to a high-level concept in the semantic graph can abstract user contextual information. Such abstraction can occur only to a part of user contextual information by patching the high-level concept, such as a node, on the low-level concept, such as multiple nodes with a structure, rather than redrawing new user semantic graph.

Figure 8:
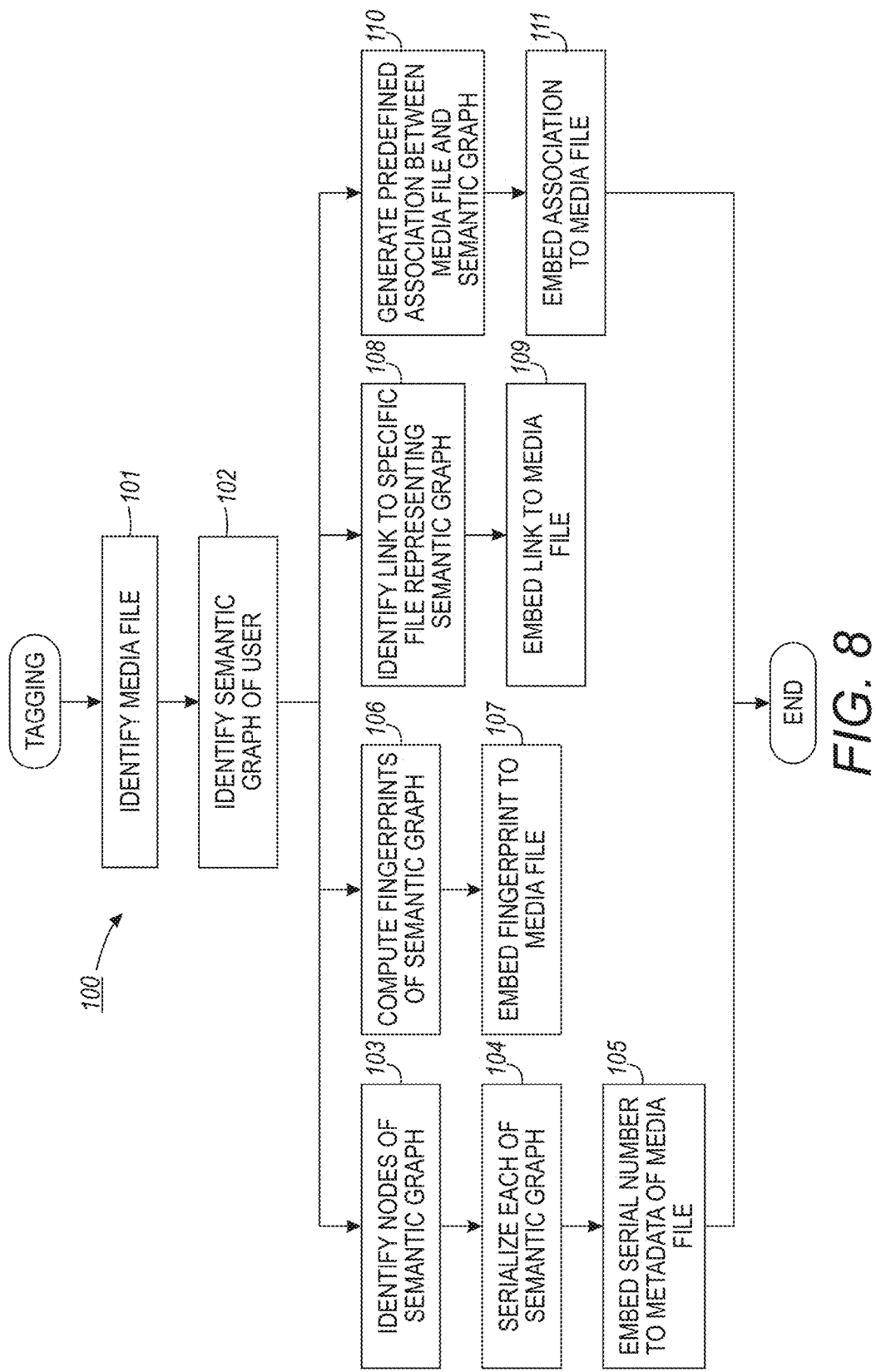
FIG. 8 is a flow diagram showing a routine for tagging a user semantic graph with a media file for use in the method of FIG. 2.

User contextual information is typically created at the same time when a media file is captured through a mobile or stationary computer and continuously created whenever new incoming contextual data is collected. The generated user contextual information is associated with the media file. FIG. 8 is a flow diagram showing a routine 100 for tagging user semantic graph with a media file for use in the method of FIG. 2. First, a media file, which is received from a user, is identified for tagging (step 101). Then, contextual information for the user, specifically a semantic graph for the user generated, as further described supra with reference to FIGS. 4-7, is identified for tagging (step 102). The tagging user contextual information to the media file can be done in various ways (steps 103-111). In one embodiment, a serialized version of contextual information can be tagged. First, data of the user contextual information, such as nodes of a semantic graph, is identified and squashed (step 103). Data squashing can be performed by moment-matching methods, likelihood-based methods and empirical likelihood methods. Nodes of the squashed semantic graph are serialized (step 104). The serialized numbers of nodes are embedded to a metadata of the media file (step 105). In a further embodiment, tagging can be performed by computing fingerprints of the user semantic graph (step 106). The fingerprints of the user semantic graph can be embedded to the media file, for example as a hash tag (step 107). In a further embodiment, a link can be used for tagging. A link representing a semantic graph is first identified (step 108). Then, the link can be embedded to the media file (step 109). In a still further embodiment, predefined association between the media file and the user semantic graph can be generated (step 110) and embedded to the media (step 111). The predefined association can be stored in the database. Other methods for tagging user contextual information to media files are possible.

The user contextual information attached to the media file can be further analyzed to determine how the media file is shared to other individuals in the social network of the user. The user contextual information can designate receivers of the media file from the user contextual information at the time the media file is captured, such as individuals in the social network of the user. Such sharing can occur at the same time when the media is tagged with the user contextual information, or when the user contextual information is shared with other individuals based on a graph production rule, such as described infra with reference to FIGS. 9 and 10 and described in commonly-assigned U.S. Patent Application Publication No. 2016/0179901, pending, the disclosure of which is incorporated by reference.

Figure 9:
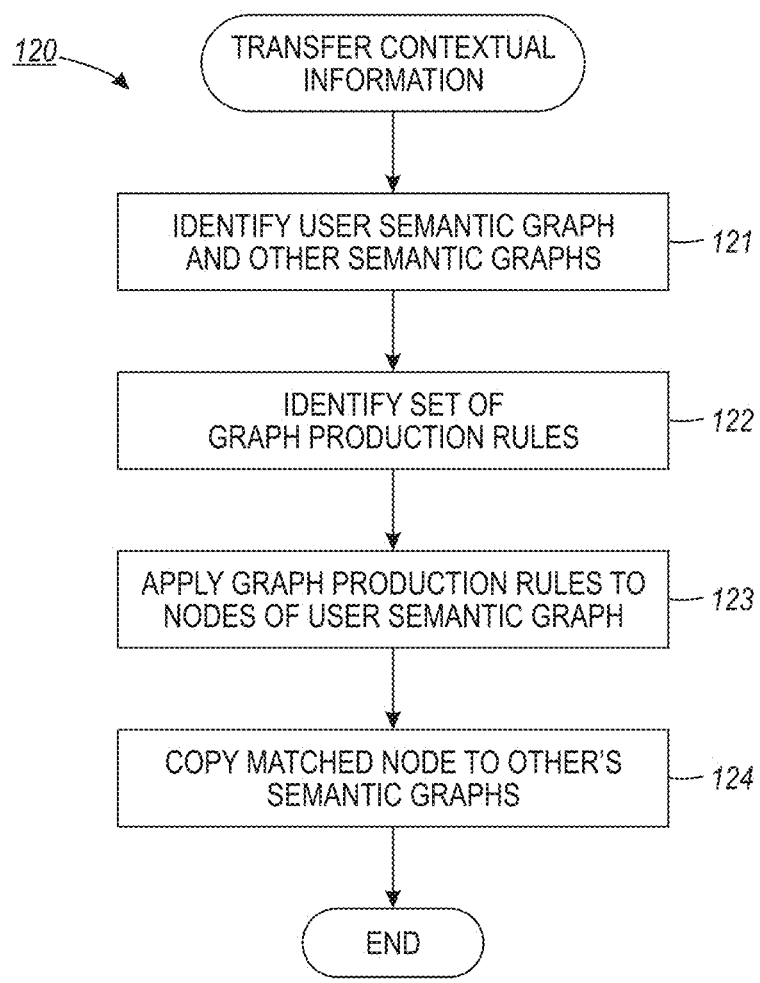
FIG. 9 is a flow diagram showing a routine for transferring user contextual information to semantic graphs for the others in the social network for use in the method of FIG. 2.
Figure 10:
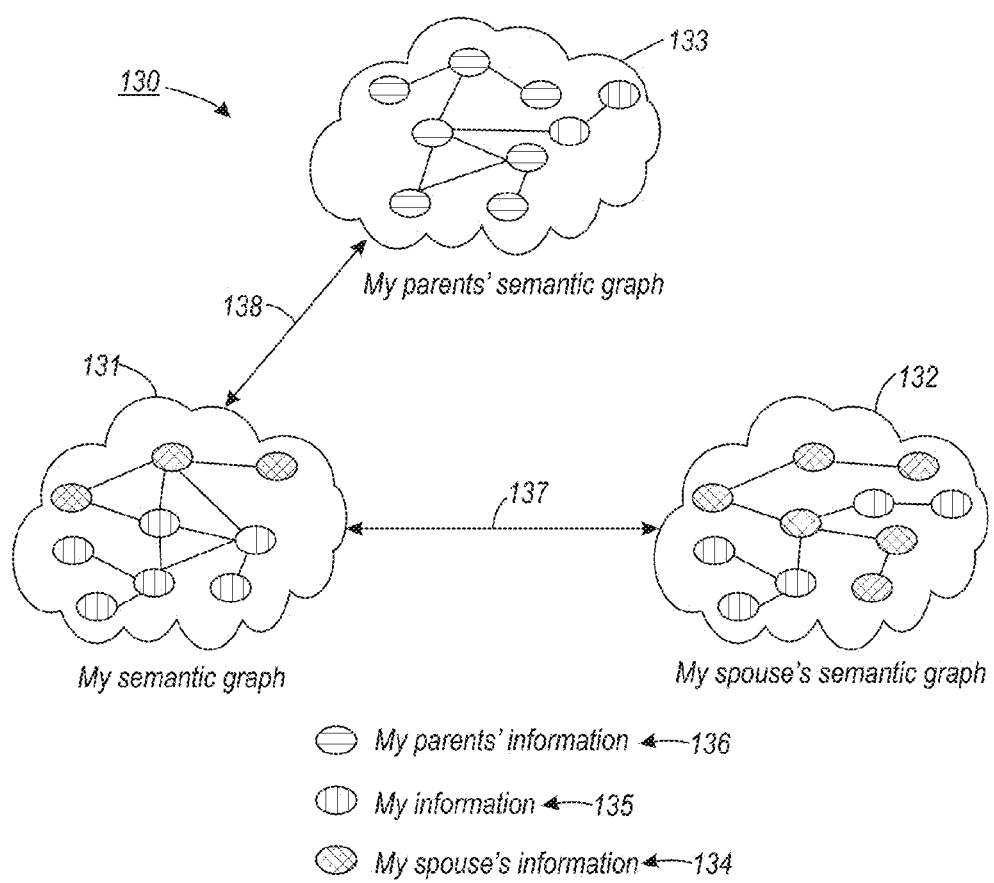
FIG. 10 is a process flow diagram showing, by way of example, a semantic relationship in a social network.

Similarly to generating a semantic graph for the user, a semantic graph for each person in the social network of the user can be optionally generated, as further described supra with reference to FIG. 4. Once the semantic graph for each person in the social network is created, insights of the user semantic graph can be transferred to the semantic graphs for others in the social network of the user. By transferring, the semantic graph for the others in the social network accurately reflects contextual information of the user. The insights of the user semantic graph can be transferred to the other's semantic graphs continuously whenever the user semantic graph is updated. As the user semantic graph can be formed as a low-level semantic graph and high-level semantic graph, the semantic graphs for the others in the social network can be formed as a low-level semantic graph or high-level semantic graph. FIG. 9 is a flow diagram showing a routine 120 for transferring user contextual information to semantic graphs for the others in the social network for use in the method of FIG. 2. First, a semantic graph for a user and semantic graphs for the others in the user's social network are identified (step 121). By way of example, FIG. 10 is a process flow diagram showing a semantic relationship 130 in a social network. A semantic graph 131 generated for a user can contain the most recent contextual information regarding the user. Similarly, a semantic graph for a spouse 132 and semantic graph for parents 133 contains their own contextual information. Referring back to FIG. 9, the insights of the user semantic graph can be transferred to other semantic graphs based on a set of graph production rules (step 122). The graph production rules define how user contextual information is copied between the semantic graphs. In one embodiment, the graph production rules can be generated for each individual in the social network. For example, a set of graph production rules can state that user contextual information such as information regarding home and family life can be copied to parents and close friends, but not to general friends. As another example, set of graph production rules can state that work related contextual information can be only copied to colleagues of the user. The graph production rules are then applied to the user semantic graph (step 123). By applying graph production rules, a node of a user semantic graph can be copied to the other's semantic graph so that the semantic graphs for others will now include the copied node in the semantic graph (step 124). In a further embodiment, graph production rules first detect graph structures of the user semantic graph and determine a meta-node representing the graph structures so that the graph structures of the user semantic graph can be copied. For instance, graph production rules can state, "when a node describing a user's location in a semantic graph is identified, the node will be copied to the other's semantic graphs" and the location information of the first user will be exposed to the second user. Referring back to FIG. 10, based on the graph production rules 137, 138, my semantic graph 131 can contain nodes regarding my information 135 and my spouse's information 134 by creating nodes derived from my spouse's graph. My spouse's semantic graph 132 can similarly contain nodes regarding my spouse's information 134 and my information 135 derived from nodes in my graph. My parents' semantic graph 133 can contain nodes of my parent's information 136 and my information 135 by copying nodes of my nodes. In this way, the media file can be shared to other individuals in the social network when the user contextual information is copied to the user contextual information of the other individuals. Other mechanisms for sharing the media file associated with the user contextual information are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing contextual media tagging for selective media exposure with the aid of a digital computer, comprising:
a non-transitory computer readable storage medium comprising program code and further comprising:
a database configured to maintain a media file; and
a set of transformation rules for a user semantic graph;
a computer processor and memory with the computer processor coupled to the storage medium, wherein the computer processor is configured to execute the program code to perform steps to:
generate with the computer processor contextual information for and collect with the computer processor contextual data regarding a user;
associate with the computer processor the media file with the user contextual information;
identify with the computer processor insights of the contextual data of the user;
generate with the computer processor a semantic graph for the user with the user contextual information comprising a plurality of nodes and edges that create graph structures;
match with the computer processor each transformation rule with each graph structure of the user semantic graph;
transform with the computer processor the matched graph structure into a single node in the user semantic graph; and
share with the computer processor the media file to other computer processors of individuals who belong to a social network of the user over a network to which the computer processor is connected to the other computer processors based on the user contextual information in the user semantic graph.

2. A system according to claim 1, wherein the computer processor is further configured to execute the program code to perform steps to:
generate with the computer processor a semantic graph for each individual in the social network;
the non-transitory computer readable storage medium further comprising:
a set of graph production rules with the computer processor for the user semantic graph, each graph production rule applying for a relationship between the user and one individual in the social network;
wherein the computer processor is still further configured to execute the program code to perform steps to
match with the computer processor each graph production rule to each graph structure of the user semantic graph; and
copy with the computer processor the matched graph structure of the user semantic graph to the semantic graph for the individual.

3. A system according to claim 1, further comprising:
the non-transitory computer readable storage medium further comprising:
a hierarchy of node categories comprised in the database comprising high level node categories and low level node categories corresponding to each high level node category as sub node categories;
wherein the computer processor is further configured to execute the program code to perform steps to:
define with the computer processor the transformation rules as replacing the low level node categories with the high level node category corresponding to the low level node categories;
apply with the computer processor the transformation rules to each graph structure of the user semantic graph; and
replace with the computer processor the graph structure as the low level node categories to the single node which is a high level node category corresponding to the low level node categories.

4. A system according to claim 2, wherein the computer processor is further configured to execute the program code to perform steps to:
serialize with the computer processor the nodes of the semantic graph; and
embed with the computer processor the serialized nodes of the semantic graph into a metadata of the media file.

5. A system according to claim 1, wherein the computer processor is further configured to execute the program code to perform steps to:
compute with the computer processor a fingerprint of the semantic graph; and
embed with the computer processor the fingerprint of the semantic graph into the media file.

6. A system according to claim 1, wherein the computer processor is further configured to execute the program code to perform steps to:
identify with the computer processor a link of the database to the user contextual information; and
embed with the computer processor the link to the media file into the media file.

7. A system according to claim 1, wherein the computer processor is further configured to execute the program code to perform steps to:
determine with the computer processor an association of the media file with the contextual information and store the association in the database; and
embed with the computer processor the association into the media file.

8. A system according to claim 1, wherein the computer processor is further configured to execute the program code to perform steps to:
recognize with the computer processor incoming new contextual data regarding the user; and
update with the computer processor the user contextual information based on the incoming new contextual data.

9. A method for providing contextual media tagging for selective media exposure with the aid of a digital computer, comprising:
maintaining a media file in a database and a set of transformation rules for a user semantic graph comprised in a storage medium;
generating contextual information with a computer processor and memory with the computer processor coupled to the non-transitory computer readable storage medium and collecting with the computer processor contextual data regarding for a user;
associating with the computer processor the media file with the user contextual information;
identifying with the computer processor insights of the contextual data of the user;
generating with the computer processor a semantic graph for the user with the user contextual information comprising a plurality of nodes and edges that create graph structures;

matching with the computer processor each transformation rule with each graph structure of the user semantic graph;
transforming with the computer processor the matched graph structure into a single node in the user semantic graph; and
sharing with the computer processor the media file to other computer processors of individuals who belong to a social network of the user over a network to which the computer processor is connected to the other computer processors based on the user contextual information in the user semantic graph.

10. A method according to claim 9, further comprising:
generating with the computer processor a semantic graph for each individual in the social network;
defining a set of graph production rules with the computer processor for the user semantic graph, each graph production rule applying for a relationship between the user and one individual in the social network;
matching with the computer processor each graph production rule to each graph structure of the user semantic graph; and
copying with the computer processor the matched graph structure of the user semantic graph to the semantic graph for the individual.

11. A method according to claim 9, further comprising:
maintaining a hierarchy of node categories comprised in the database comprising high level node categories and low level node categories corresponding to each high level node category as sub node categories;
defining with the computer processor the transformation rules as replacing the low level node categories with the high level node category corresponding to the low level node categories;
applying with the computer processor the transformation rules to each graph structure of the user semantic graph; and
replacing with the computer processor the graph structure as the low level node categories to the single node which is a high level node category corresponding to the low level node categories.

12. A method according to claim 9, further comprising:
serializing with the computer processor the nodes of the semantic graph; and
embedding with the computer processor the serialized nodes of the semantic graph into a metadata of the media file.

13. A method according to claim 9, further comprising:
computing with the computer processor a fingerprint of the semantic graph; and
embedding with the computer processor the fingerprint of the semantic graph into the media file.

14. A method according to claim 9, further comprising:
identifying with the computer processor a link of the database to the user contextual information; and
embedding with the computer processor the link to the media file into the media file.

15. A method according to claim 9, further comprising:
determining with the computer processor an association of the media file with the contextual information and storing the association in the database; and
embedding with the computer processor the association into the media file.

16. A method according to claim 9, further comprising:
recognizing with the computer processor incoming new contextual data regarding the user; and
updating with the computer processor the user contextual information based on the incoming new contextual data.

* * * * *